April 21, 1970
F. J. G. VAN DEN BOSCH
3,507,987
HIGH RESOLUTION ULTRA-VIOLET MICROSCOPE
SYSTEMS UTILIZING A VIDEO DISPLAY
Filed March 4, 1966
4 Sheets-Sheet 1
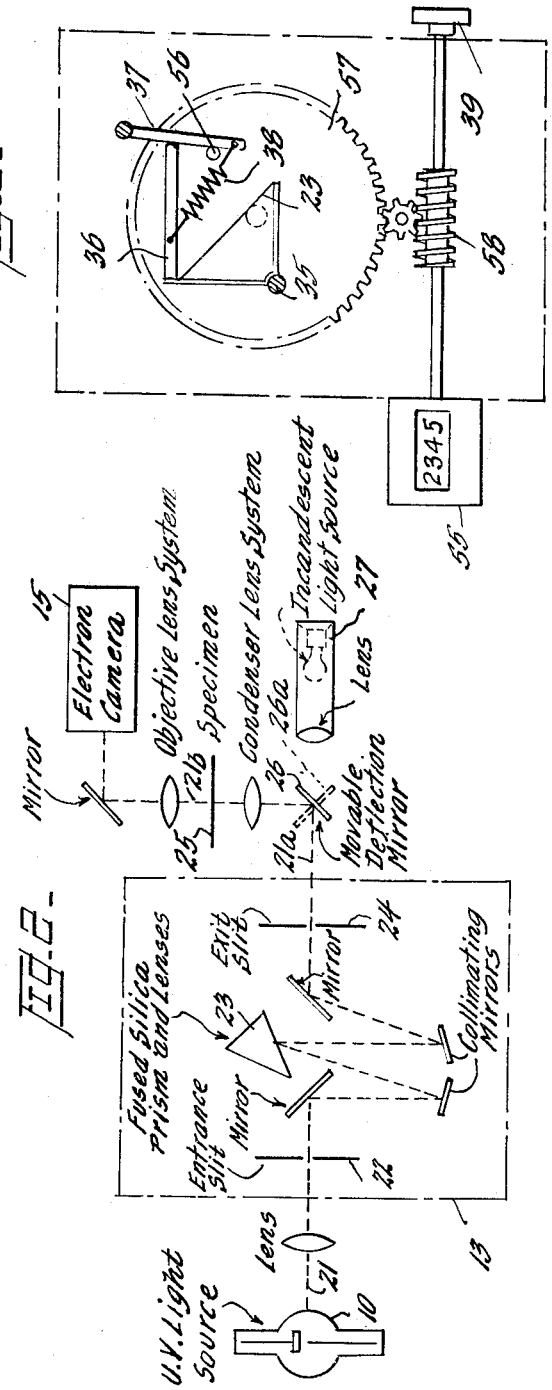
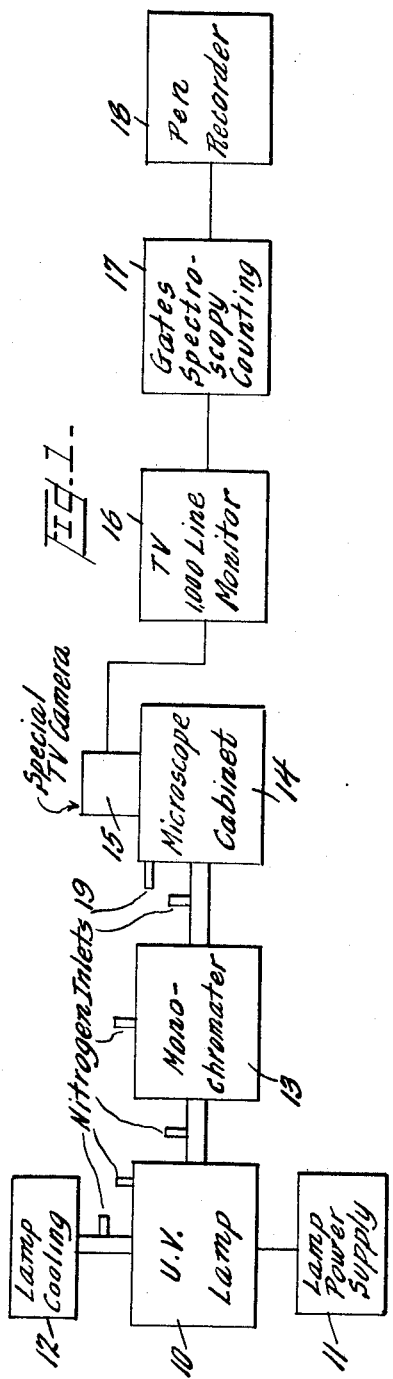
INVENTOR.
Francois J. G. Van Den Bosch,
BY
Watson, Cole, Grindle "o Watson
ATTORNEYS.

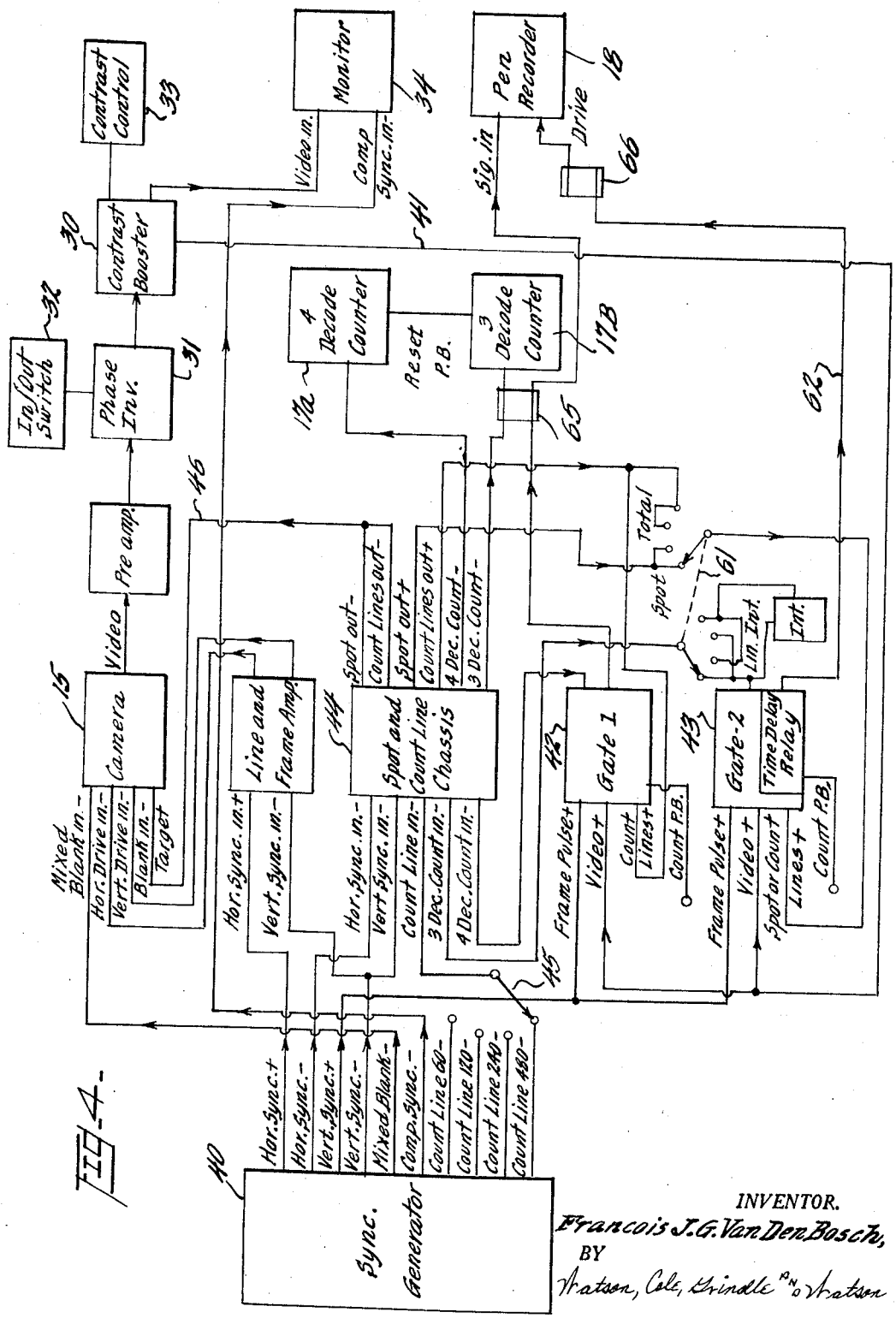

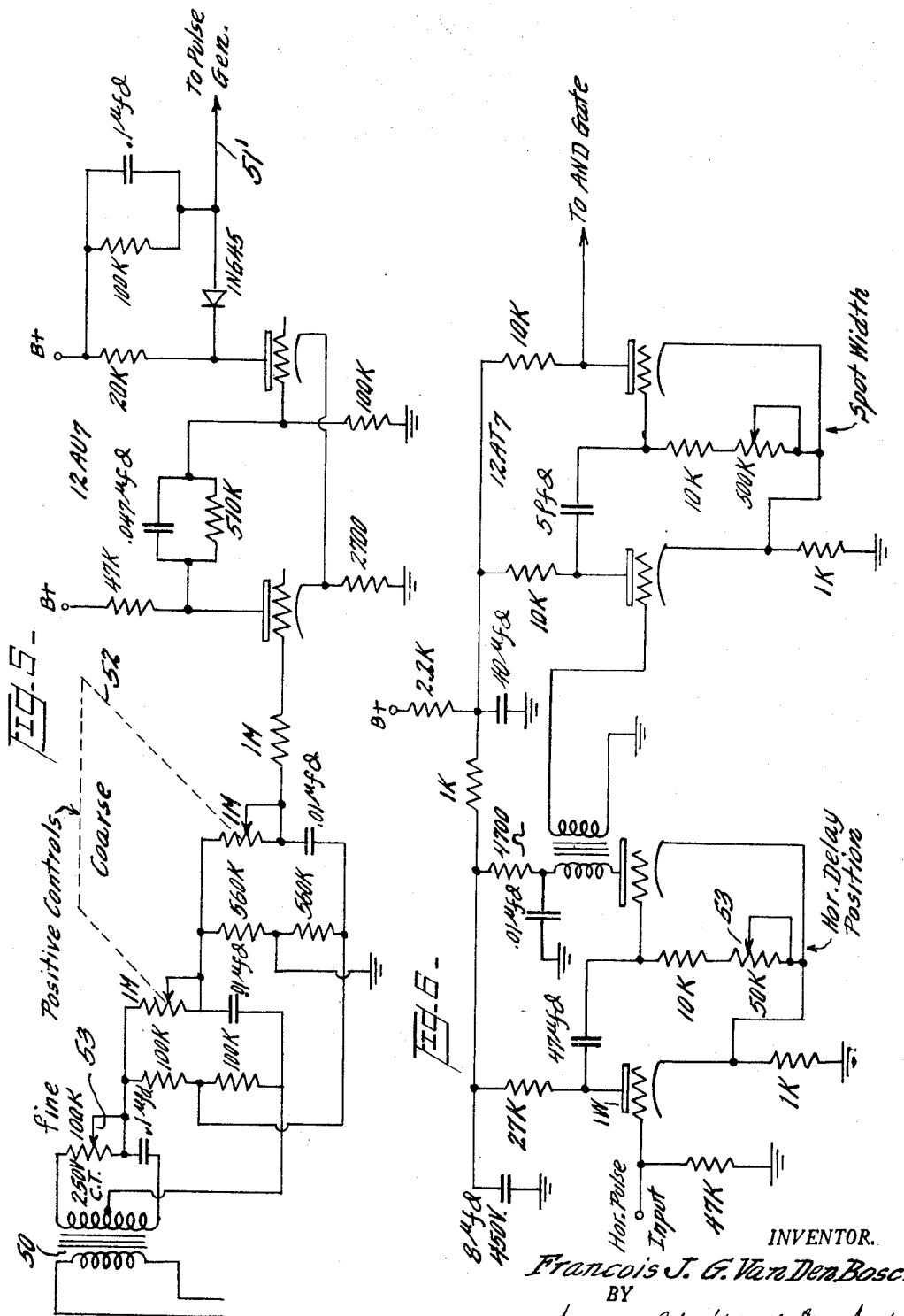

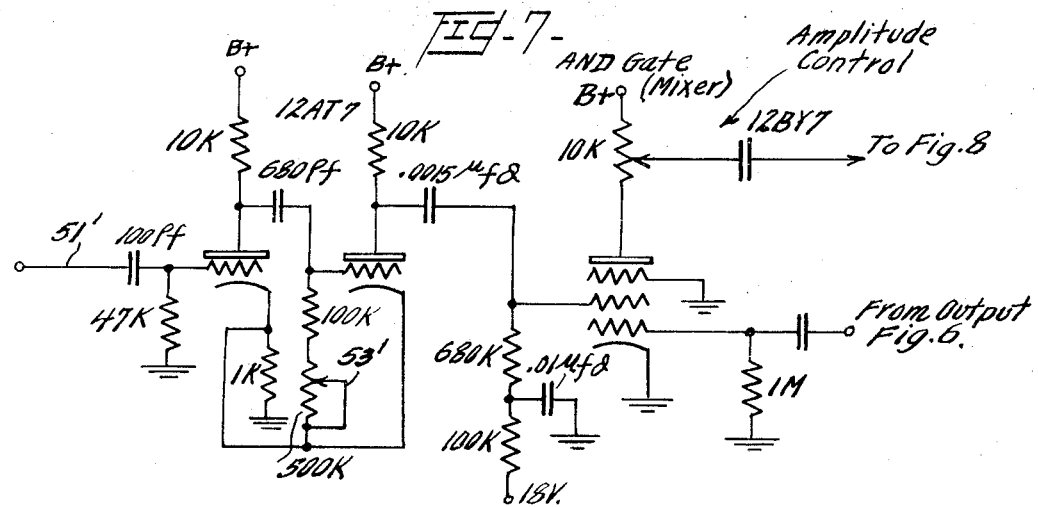
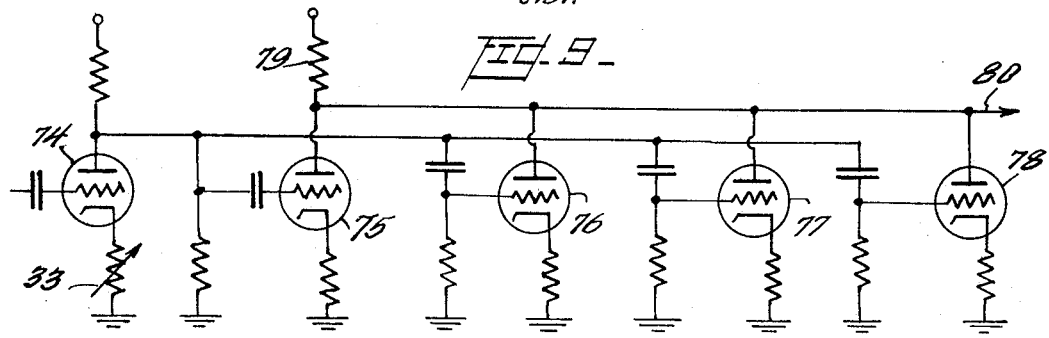
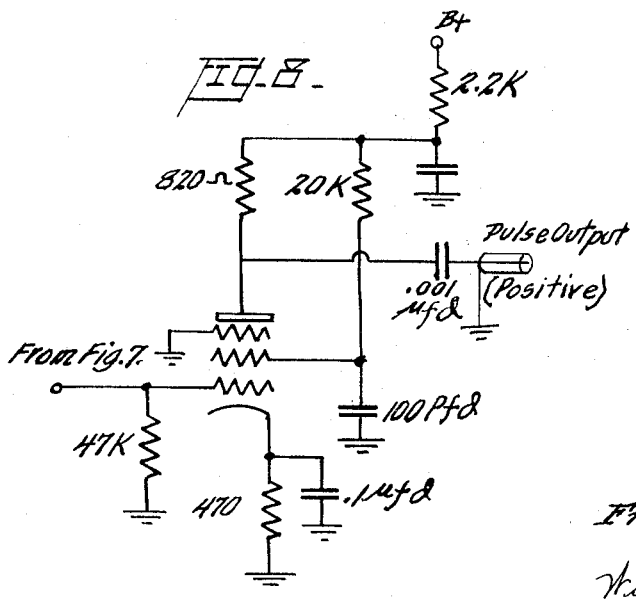
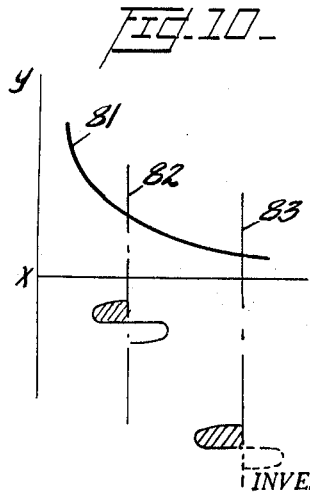

3,507,987
HIGH RESOLUTION ULTRA-VIOLET MICROSCOPE SYSTEMS UTILIZING A VIDEO DISPLAY
Francois J. G. van den Bosch, 11 Hillcrest Road, Cedar Grove, N.J. 07009
Filed Mar. 4, 1966, Ser. No. 531,703
Int. Cl. H04n 7/18
U.S. Cl. 178—6.8                                              3 Claims

ABSTRACT OF THE DISCLOSURE

An improved ultra-violet microscope includes apparatus for selecting a specific area of a specimen for viewing on a video screen by delaying both the horizontal and vertical video signals representing the specimen which are generated by a video camera as an aid in observing a microscopic specimen.

---

This invention relates to microscopes and, more particularly, to high resolution microscope systems using ultra-violet light.

Contrary to the popular conception, the magnification of a microscope is less important than its resolving power. Microscopes are used to reveal fine details rather than to give enlarged images of what is already visible to the naked eye. It is true that these details must be rendered large enough to be seen in the image, but "empty" magnification which does not bring out additional minute details is of little aid in the study of any object.

By the resolving power of an optical instrument is meant its ability to produce separate images of objects very close together. Not only must the minute features of specimen be revealed, but there must be a true rendition of their size and shape. This resolution has a simplified formula :=0.61λ, where λ represents the wavelength of the light source. It is therefore logical to assume that with ultra-violet light, the wavelength of which is shorter than that of visible light, one should have a greater separating power, or resolution, than with ordinary white light. This is borne out by the fact that ultra-violet light improves the resolution by a factor of about three over the ordinary light microscope. Put it in other words, the ultra-violet microscope allows objects to be seen three times smaller than with any conventional optical microscope.

The success of ultra-violet microscopes in the prior art has been limited to the nearly visible light regions and thus has not been useful to significantly extend the resolution capabilities in microscope systems.

It is thus an object of this invention to extend the use of ultra-violet energy in a microscope beyond former limitations, thereby increasing the resolving power.

A general object of the invention is to provide new microscope systems with improved features and improved resolution.

A further requirement in microscopes is the ability to recognize contours, shapes, and absorption characteristics of specimens under observation. Thus, the effective resolution may be improved beyond the resolving power of the microscope by provision of compatible methods of observing the physical properties of the specimen under observation.

Accordingly, a still further object of the invention is to provide means compatible in an ultra-violet microscope system for effectively increasing the resolution power by detecting physical properties of the specimen.

Thus, in accordance with the present invention a microscope is provided operable from an ultra-violet light source providing energy at least in the range of 2000 to 3100 Angstroms, and having a broad band characteristic at least in the range of 2000 to 8000 Angstroms, and incorporating a lens system transmitting such energy with little loss such as provided in fused silica lens element. This invention provides for enclosing all the lenses and the entire ultra-violet light path in an airtight housing filled with an oxygen free inert gas such as nitrogen or argon. It has been found that otherwise resolution improvements are insignificant because the ultra-violet light generates ozone and this in turn obsorbs energy in the specified range.

The energy is further passed through a selective frequency filter or monochromator in order to determine the affinity of the specimen to absorb different spectral bands thus providing an additional spectrogrammic qualitative identification useful in indicating various chemical and biochemical properties of the specimen.

Contours are observable by medium of passing the ultra-violet energy through the specimen at various angles such as accomplished by a movable deflection mirror and further contour identification is achieved in the electron camera portion of the microscope system by medium of contrast booster apparatus and choice of positive and negative picture displays.

These and further features and advantages of the application are described throughout the following specification, with reference to the accompanying drawing, in which:

FIGURE 1 is a block schematic diagram of the improved microscope system afforded by this invention, FIGURE 2 is a schematic diagram of the lens system and accompanying ultra-violet light path through the microscope, FIGURE 3 is a diagrammatic view of a monochromator assembly provided in accordance with the invention.

FIGURE 4 is a block diagram of control circuits within the electron camera,

FIGURE 5 is a schematic circuit diagram of a spot selection control circuit.

FIGURE 6 is a schematic circuit diagram of a horizontal spot generator,

FIGURE 7 is a schematic circuit diagram of an "AND Gate" control circuit,

FIGURE 8 is a schematic circuit diagram of output stage for spot,

FIGURE 9 is a schematic circuit diagram of a contrast amplifier tube circuit, and FIGURE 10 is a diagram explanatory of FIGURE 9.

As may be seen in FIGURE 1, the light energy source for the microscope is the ultra-violet lamp 10 which may be a 5000 watt Xenon mercury filled lamp with a suprasil bulb permitting good UV transmission down to 1900 Angstroms. A lamp power supply 11 and cooling unit 12 are supplied.

Spectral selection of a reduced range band of light is selected in monochromator 13 placed in the path of the ultra-violet light to the microscope cabinet 14 and associated electron camera 15 which is coupled to the TV monitor system 16. This camera-monitor-microscope cabinet system may include for example, an electronic particle counter 17 such as described in my U.S. Patent 3,073,521 issued Jan. 15, 1963, and having provisions for an auxiliary chart or pen recorder 18. Certain variations and special features incorporated in this invention are described with particularity in this specification.

It is to be specifically for example, since the ultra-violet lamp source 10 is supplied here, the paths of the ultra-violet energy are entirely enclosed in a container or series of air tight containers which may be filled through inlet plugs 19 with an oxygen free gas such as nitrogen or argon. If separate containers are used, the ultraviolet light path passes through thin abutted windows of fused silica or other transparent low loss conductor of ultra-violet energy. This construction prevents creation of ozone ($O^3$) by the ultra-violet rays, which in turn absorbs the ultra-violet energy particularly in the range of 2000 to 3100 Angstroms and prevents the desired improved resolution effected from the lower wavelength regions afforded by the present ultra-violet microscope when enclosed in this special container.

The path 21 of the ultra-violet light through the lens system in which all lenses through which the UV energy passes are reflecting mirror lenses or are of low-loss fused silica or equivalent material, as shown in the array of FIGURE 2. In this path is interposed the monochromator 13 which serves by an entrance slit 22, and a series of collimating mirrors about the prism 23 to bring through the exit slit 24 a small spectral range of selected energy within the band provided by the light source 10 for proceeding through the remainder of the path 21a.

It is thus seen the rotation of the prism 23 may be calibrated to provide with the width of slit 24 a spectral monochromatic band of light which serves the hereinbefore described purpose of determining the reaction of a specimen at platform 25 to different light frequency ranges to give a monochromatic spectrogrammic qualitative check in addition to the optical resolving power of the microscope, which is enhanced by the use of ultra-violet light in the oxygen-free path 21.

This may be accomplished by means such as shown in FIGURE 3, wherein prism 23 is rotated about pivot pin 35 by movement of cammed lever 36 held against pivoted lever 37 by spring 38. Thus, as knob 39 is turned to actuate worm gear shaft 58 and calibrated counter 55, cam pin 56 is rotated upon gear 57 to give very precise control of the prism rotation angle.

Furthermore, deflection mirror 26 (FIGURE 2) is made movable in a similar manner to direct the incidence of light path 21b upon the specimen platform 25, thereby to accentuate contours and shadows within a specimen under observation. A choice of incandescent light may be made by actuating light source 27, if desired directly and solely by moving the deflection mirror to position 26a.

The electron camera 15 has an image-orthicon or vidicon tube or similar tube for example, focused on an ultra-violet sensitive cathode film responsive at least from 2000 to 3100 Angstroms on an ultra-violet transparent optically flat window of suprasil glass or glass having good transmission in UV down to 1800 Angstroms, and as heretofore explained the entire ultra-violet energy path 21 is immersed in nitrogen or argon gas within a hermetically sealed tubing or housing.

Since the video signal in the TV monitor consists of a picture magnified by some 30,000 times, contrast is lost so that a contrast boster 30 is incorporated in the video channel of the camera 15, as shown in FIGURE 4. This has a circuit known in the television art as a gamma control amplifier circuit which amplifies the black portion of the picture more than the white to restore and supplement picture contrast.

As shown in FIGURES 9 and 10, video amplifier tube 74 drives successive tubes 75, 76, 77, and 78 with common anode resistor 79. The output signal at lead 80 has increased black amplification or contrast which can be amplitude controlled by a variable degeneration cathode resistor 33. The successive stages operate at different signal levels on curve 81 so that tube 75 may result in amplification around base 82 to give a full output but other tubes may have increasing bias to tube 78 which around base 83 completely removes the white portion of the video signal. With all these signals merged at lead 80, then the black contrast is enhanced (or the white signal if the phase at tube 74 is inverted).

The phase inverter section 31 together with in-out switch 32 provides for choice of either a positive or negative picture to give a further dimension of the physical viewing of images. Thus, the effective resolution of many different types of specimens under observation may be enhanced by selective control of the movable deflection mirror 26, the positive or negative signal selection 32 or the magnitude of the contrast provided by amplitude control 33. The video amplifier system has an effective bandwidth of 20 megacycles and the monitor 34 has a resolution of at least 875 lines.

Provision is made for spot selection on the specimen platform of a very small position in the field of view for display upon counters 17A, 17B, monitor 34 and pen recorder 18 accomplished by the synchronized selection circuits controlled from synchronization generator 40 to select a manually selected portion of the video signal conveyed through this circuit from lead 41. Thus, gating circuits 42 and 43 are responsive to pass the video signal only in the presence of the selected horizontal lines as chosen by the line counter section 44 and switch section 45.

The selected spot area within a complete picture is made visible upon monitor 34 by means of spot control signals on lead 46 used to convey blanking input signals to camera 15. Note both the positive (+) sync signals and the negative (−) sync signals distinguished by appropriate labels are available and the blanking signal at lead 46 also is designated as negative and thus serves to provide blanking in the spot region.

In order to examine spectroscopically a very small area of the preparation it has been necessary to resort to an original electronic concept for creating a small area or spot in the scanning raster of the camera and the monitor. Such a small area can be produced by the intersection of one vertical field pulse and one horizontal line pluse. This can be achieved by taking a vertical field pulse and one horizontal line pulse. This can be achieved by taking a vertical field pulse from the synchronization generator and feeding this into what is known in the electronic art as a delay multivibrator. Such a procedure will make it possible to move the vertical line across the scanning raster simply by acting on the delay control, after this the field pulse is fed into a blocking oscillator giving a sharp pulse of very short duration after which it is supplied to a mixing stage. This stage also receive the pulse from a horizontal line pulse generator feeding into another delay multivibrator and blocking oscillator. By acting on the vertical delay, the intersection of both pulses or spot can be moved in a vertical direction and similarly, by acting on the horizontal delay, this spot can be moved in a horizontal direction within the scanning raster.

Another method of achieving the same result has been shown in FIGURES 5, 6, 7, and 8. Since the synchronous generator is locked to the supply mains, FIGURE 5 shows how the field pulse is obtained from the supply mains and used to trigger a multivibrator of the Schmitt trigger type. The output of this multivibrator is then fed to a delay multivibrator shown in FIGURE 7 and the output of this is then impressed on the screen grid of a mixer tube or "AND gate." FIGURE 6 shows the delay multivibrator triggered by the horizontal line pulse taken from the synchronous generator. This delay multivibrator also generates a sharp pulse of very short duration by a blocking oscillator type of circuit shown in the second half of this circuit, the output of which is then supplied to the "AND gate" or mixing stage on the control grid of this tube the output of this tube is then fed into the pulse amplifier output stage shown in FIGURE 8. The output pulse from this last stage is then supplied to the control electrode of the camera tube and will thus form part of the video signal, since the position of this spot can be moved in a vertical manner with respect to the scanning raster and also in a horizontal manner a small area of which the spectrogrammic content it is desired to acquire can thus be covered by the spot. When the video signal is then fed into the corresponding gate circuit as described in my U.S. Patent 3,073,521 only the video signal covered by the spot will emerge and a qualitative spectrogrammical analysis of a very small portion of the specimen under examination can thus be made immediately.

In a similar manner counting lines can be applied to the control electrode of the electron camera. These counting lines can be obtained by taking the pulses from the frequency division stages from the synchronous generator at points corresponding to the number of desired lines. Again as with the spot when the video signal containing these lines is supplied to its own gate circuit only the video signal covered by the lines will emerge and this partial video signal can then be used for a counting system or spectrogrammic recording.

Video signals to the pen recorder are gated by circuit 42 by way of leads 63 and 64 when relay 65 (operated along with relay 66) puts the pen recorder 18 and decade counter 17B into the ready state.

It is thus seen that various controls such as organized in FIGURE 4 can be supplied for the TV camera to permit use of auxiliary viewing devices such as counters 17 and recorder 18, and to permit selection of specific viewing areas for scrutiny.

Accordingly, this ultra-violet microscope system not only provides better resolution but affords versatility in maneuvering the specimen and observing the specimen with different counting, shadow and frequency controls so that effective resolution is also greatly enhanced to permit a wide range of specimens having different characteristics to be observed. Thus for example, the microscope is useful in the medical or biological fields and can be study live materials without staining the specimen. With a radiation bandwith of 3 Angstroms for example determined by the monochromator, the radiation energy on a live specimen is so small that observation can take place over a considerable period of time. Thus, the technique of transmission absorption microscopy by means of this invention is significantly improved in resolving power.

When the spot is applied to the control electrode of the electron camera it will form part of the resulting video signal and thus be displayed on the monitor viewing screen. With the vertical and horizontal controls the spot can thus be moved as desired for spectrogrammic examination. Since the spot results in only one pulse being superimposed on the video signal, the extent of the absorption will give rise to a pulse, the height of which will be directly proportional to the degree of absorption. The gate circuit however, will only open for the time of this pulse length and if applied directly to the recording system (pen recorder or magnetic tape) the absorption gradient will be shown when the wavelength is being changed by the monochromator. If directly applied to the counting system, it will result in a count of one only, this is inherent to a pulse counter. It is however, highly desirable to have the digital counter giving a counting figure directly proportional to the absorption gradient and thus in a certain way corresponding to the recording system. To achieve this a device known in the electronic art as a voltage sensitive multivibrator or blocking oscillator is interposed between the output terminal of the gate circuit and the input of the counting system. This will result in a pulse frequency directly proportional to the input voltage. The counter is then calibrated for a zero absorption signal and a maximum absorption signal. The figures displayed by the counter are then also related to the recording system. This is, in essence, an analog to digital converter contained in block 17 of FIGURE 1.

Furthermore, the specimen under examination will reveal its specific absorption when irradiated with a narrow band monochromatic radiation. Thus, a specific spectrogram can immediately be drawn up while examining the specimen. A small area selected on the monitor screen can also be covered by the spot and by successively irradiating the specimen with narrow band monochromatic radiation by moving the wavelength control of the said monochromator a complete spectrogram of that small area of the specimen can be made immediately. As an example, one might refer to the great sensitivity of the mitochondria of a cell to cell injury when irradiated with ultra-violet light below the 3000 Angstroms, in another example on examining the nucleus of a cell it is possible to ascertain the presence of nucleic acids since these absorb strongly at about 2600 Angstroms in death cells or injured cells while absorption is almost totally absent in normal living cells. Nucleic absorption varies considerably from cell to cell depending on the metabolic state spectrogrammic confirmation of visual and film recorded or TV signal recorded pictorial observations will thus be invaluable in identifying not only the chemical composition but also the nature of the state of the cell under examination.

Accordingly, these novel features believed descriptive of the nature and scope of the invention are defined with particularity in the appended claims.

What is claimed is:
1. A high resolution microscope system comprising in combination,
   a light source providing energy in at least the range of 2000 to 8000 Angstroms,
   a specimen platform,
   a lens system transmitting said range of energy with little loss arranged to convey ultra-violet energy from said source along a path impinging upon said platform,
   an electron camera responsive to said ultra-violet energy arranged to view said specimen platform and to produce a video signal therefrom,
   means for producing a visual image from said video signal,
   means for selecting a portion of said video signal, said selecting means including spot control means for selecting predetermined combinations of vertical and horizontal components of said video signal corresponding to specific portions of said specimen platform,
   means for indicating said selected portion upon said visual image, and
   an air tight housing assembly about the ultra-violet path between said light source and said camera filled with an oxygen free inert gas.
2. A high resolution microscope system as in claim 1 wherein said vertical component consists of vertical signals from said video signal and said horizontal component consists of horizontal signals from said video signal, said selecting means further including delay means for receiving said vertical and horizontal video signals so that by varying the delay of both the horizontal and vertical video signals the specific portion of said specimen which is viewed is selected.
3. A high resolution microscope system as in claim 1 wherein said delay means further includes blocking oscillator means and wherein said means for selecting further includes AND gate means for mixing the output of said delay means to provide signals for viewing the selected portion of said specimen.

(References on following page)

References Cited

UNITED STATES PATENTS

| | | | |
|---|---|---|---|
| 2,837,655 | 6/1958 | Lang | 250—71 |
| 2,913,584 | 11/1959 | Dill | 250—235 |
| 3,297,873 | 1/1967 | Hovnanian | 250—71 |
| 3,427,273 | 2/1969 | Newing | 250—71 |
| 2,153,010 | 4/1939 | Snook | 88—24 |
| 2,510,670 | 6/1950 | Trott. | |
| 2,731,202 | 1/1956 | Pike. | |
| 2,803,406 | 8/1957 | Nuttall. | |
| 2,835,167 | 5/1958 | Pierce | 350—19 |
| 3,124,682 | 3/1964 | Kojima | 350—19 |
| 3,221,099 | 11/1965 | Breitbord. | |

OTHER REFERENCES

Zwormkin, Morton, Television, 1954, 2nd ed., pp. 946–952.

ROBERT L. GRIFFIN, Primary Examiner

J. A. ORSISO, JR., Assistant Examiner

U.S. Cl. X.R.

250—65, 71.5; 350—19